(12) United States Patent
Fujimoto et al.

(10) Patent No.: US 8,350,904 B2
(45) Date of Patent: Jan. 8, 2013

(54) MICROSCOPE FOR VIRTUAL-SLIDE CREATING SYSTEM

(75) Inventors: Yasushi Fujimoto, Hino (JP); Yoshihiro Kawano, Bethlehem, PA (US)

(73) Assignee: Olympus Corporation, Tokyo (JP)

( * ) Notice: Subject to any disclaimer, the term of this patent is extended or adjusted under 35 U.S.C. 154(b) by 640 days.

(21) Appl. No.: 12/578,912

(22) Filed: Oct. 14, 2009

(65) Prior Publication Data

US 2010/0091101 A1    Apr. 15, 2010

(30) Foreign Application Priority Data

Oct. 14, 2008    (JP) ................................. 2008-265451
Aug. 3, 2009    (JP) ................................. 2009-180949

(51) Int. Cl.
*G06K 9/00*    (2006.01)
*H04N 5/335*    (2011.01)
*G02B 21/02*    (2006.01)

(52) U.S. Cl. ............ 348/79; 348/63; 348/110; 348/199; 348/294; 382/133; 382/284; 382/286; 382/128; 359/661

(58) Field of Classification Search ........................ None
See application file for complete search history.

(56) References Cited

U.S. PATENT DOCUMENTS

| 6,101,265 | A | 8/2000 | Bacus et al. |
| 6,272,235 | B1 | 8/2001 | Bacus et al. |
| 2007/0139541 | A1* | 6/2007 | Fein et al. ..................... 348/294 |
| 2007/0147673 | A1* | 6/2007 | Crandall ....................... 382/128 |
| 2008/0180805 | A1* | 7/2008 | Yonetani ....................... 359/661 |

FOREIGN PATENT DOCUMENTS

| JP | 2002-031760 | 1/2002 |
| JP | 2008-185965 | 8/2008 |

OTHER PUBLICATIONS

Mortimer Abramowitz, Microscope Objectives, Jul. 15, 2007, Website: <http://web.archive.org/web/20070715064534/http://micro.magnet.fsu.edu/primer/anatomy/numaperture.html>.*
"ScanScope XT System" by Aperio (http://www.aperio.com/PDF_docs/quicklinks/XT%20Data.pdf).

* cited by examiner

*Primary Examiner* — Joseph Ustaris
*Assistant Examiner* — William Adrovel

(57) ABSTRACT

A microscope for virtual-slide creating system has a stage for holding the specimen, a transmitted-light illumination optical system for illuminating the specimen with transmitted light, an objective, a tube lens and an image capture unit. The objective is configured as a dry system of infinity-corrected type with an object-side numerical aperture of 0.8 or greater and a focal length for d-line rays in a range from 8 to 20 mm. The tube lens has a focal length in a range from 160 to 280 mm. The image capture surface of the image capture unit has a long side of 12 mm or longer and a pixel size (μm) satisfying the following condition:

$$a\ (\mu m) \leq (0.61 \times 0.59\ (\mu m))/NA'$$

where a is the pixel size, and NA' is an image-side numerical aperture.

11 Claims, 9 Drawing Sheets

EMBODIMENT 15
IMAGE FORMING OPTICAL SYSTEM : fIM=8.15mm,24.5×,
NA=0.9,OBJECT-SIDE VIEW FIELD=1.5mm

FIG.3
FIG.4
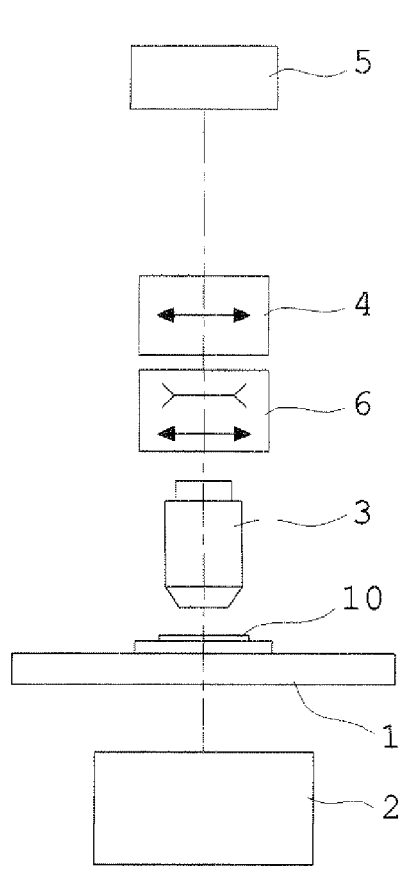
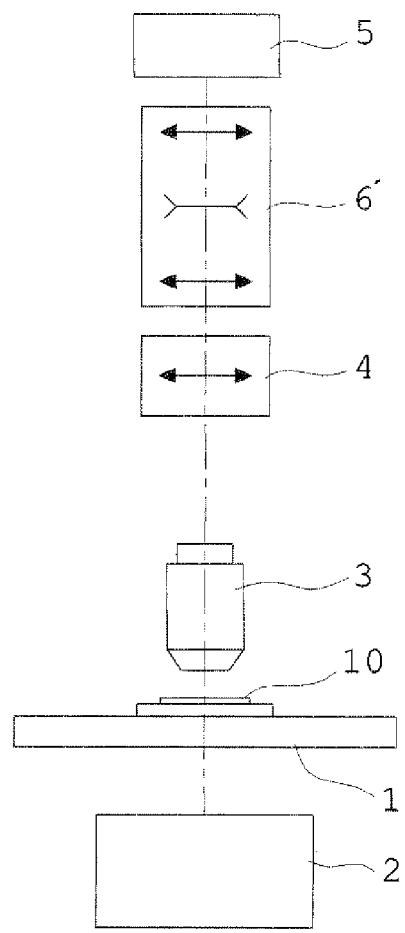

EMBODIMENT 5 OBJECTIVE : $f_{OB}$=17.98mm, NA=0.9,
OBJECT-SIDE VIEW FIELD=2.5mm

EMBODIMENT 6 OBJECTIVE : $f_{OB}=8.99mm$, NA=0.9, OBJECT-SIDE VIEW FIELD=1.5mm

EMBODIMENT 7 OBJECTIVE : $f_{OB}=8.99mm$, NA=0.95, OBJECT-SIDE VIEW FIELD=1.25mm

EMBODIMENT 8   TUBE LENS : $f_{TL}=160$mm

EMBODIMENT 9   TUBE LENS : $f_{TL}=180$mm

EMBODIMENT 10  TUBE LENS : $f_{TL}$=220mm

EMBODIMENT 11   TUBE LENS : $f_{TL}=280mm$

FIG.12
FIG.13
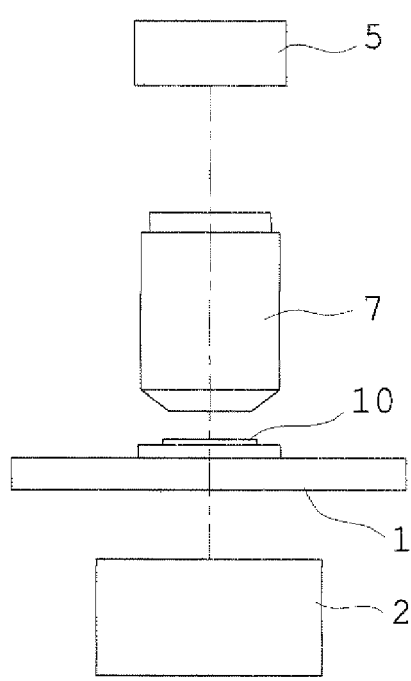
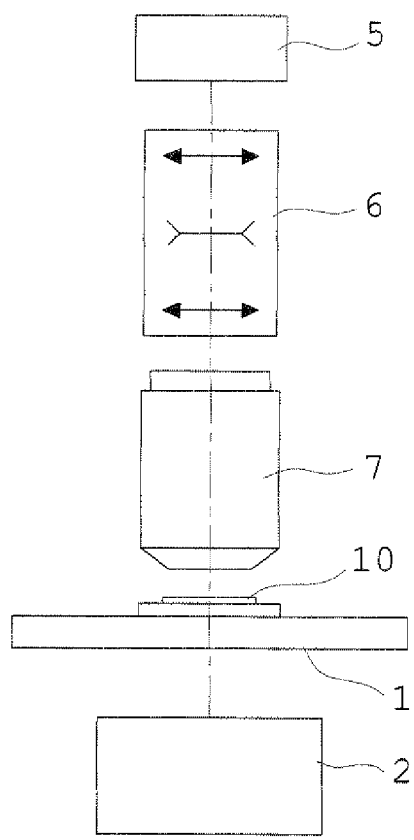

EMBODIMENT 14
IMAGE FORMING OPTICAL SYSTEM : $f_{IM}$=19.49mm, 10×, NA=0.9,
OBJECT-SIDE VIEW FIELD=2.5mm

EMBODIMENT 15
IMAGE FORMING OPTICAL SYSTEM : $f_{IM}$=8.15mm, 24.5×,
NA=0.9, OBJECT-SIDE VIEW FIELD=1.5mm

EMBODIMENT 16
IMAGE FORMING OPTICAL SYSTEM : $f_{IM}$=8.05mm, 31.1×,
NA=0.95, OBJECT-SIDE VIEW FIELD=1.25mm

MICROSCOPE FOR VIRTUAL-SLIDE CREATING SYSTEM

This application claims benefits of Japanese Patent Applications No. 2008-265451 filed in Japan on Oct. 14, 2008 and No. 2009-180949 filed in Japan on Aug. 3, 2009, the contents of which are hereby incorporated by reference.

BACKGROUND OF THE INVENTION

1) Field of the invention

The present invention relates to a microscope used for a virtual-slide creating system.

2) Description of the Related Art

Conventionally, in specimen observation by a specialist in pathology using an optical microscope, there has been adopted a technique that includes shifting of a stage (or a specimen on the stage) for searching a site to be examined while observing the entire image of the specimen using a low-magnification objective about 10× or 20× and subsequent enlargement and close observation of the very site upon changing to a high-magnification objective about 40×.

However, moving the stage (or the specimen on the stage) and changing the objective for changing the field and enlarging the image each time of observation of the site to be examined complicates the operation. In addition, in a case where a plurality of sites to be examined are scattered over a specimen, it is difficult to grasp a relative position of each site in reference to the entire region of the specimen, and thus a great effort is required for identifying pathological changes.

In this case, if a specialist in pathology tries, using an optical microscope, to divide the specimen into a plurality of minute segments, to capture an enlarged image for each segment and to patch these images together for the purpose of grasping a relative position of each site in reference to the entire region of the specimen, it involves such enormous trouble and time as to prevent the specialist from making volumes of diagnosis and thus possibly has unfavorable consequences to patients who wait for diagnostic result.

In addition, under the recent circumstances where shortage of medical specialists is recognized as a problem, most of small- or middle-scale hospitals and remote-area facilities are without specialists in pathology. Furthermore, there are special and rare pathological changes that are difficult to diagnose for others than specialists in pathology of special fields. In such a case, a specimen on a slide glass has to be transported to ask for diagnosis by such a specialist in pathology of the special field, and thus it takes substantial number of days until the diagnostic result is available.

In recent years, proposals have been made for a virtual-slide creating system, which makes it possible to make simulative microscopic observation by, upon preliminarily capturing and accumulating a specimen on a slide glass as high-definition digital images, displaying the digital images of the specimen on a display unit of a personal computer or the like as controlling magnification and observation position.

A virtual-slide creating system is generally configured to have: a microscope provided with an illumination optical system, an image capture unit, and a stage which holds a specimen is movable in predetermined directions; a control means which conducts overall control of the system including operation control of the components thereof; and a storage means which stores digital images captured by the image capture unit. The control means segments the observation region of the specimen on a slide glass into microregions in accordance with a magnification, makes the image capture unit sequentially scan the microregions to capture images while moving the stage, and makes the storage means store the images upon adding positional data of the individual microregions in reference to the entire image corresponding to the entire observation region. In addition, for each microregion, images focused on respective depths, which are predetermined for each specimen, are captured. In this way, the virtual-slide creating system is designed to capture and store, for each predetermined magnification, images of three-dimensional regions regarding the specimen.

The digital image data created by the virtual-slide creating system can be utilized so that an image of a desired observation site with a desired magnification is displayed on a display screen of a network-connected computer of a specialist in pathology via a virtual-slide display system.

Therefore, use of the virtual-slide system can dispense with complicated operations as required for pathological diagnosis using a conventional optical microscope, lighten a work required for identification of pathological changes, and save time. In addition, since a virtual slide is composed of digital data, digital image data of a specimen can be transmitted to a specialist in pathology in no time even from a remote area, so that an early diagnostic result can be obtained from the specialist.

In addition, digital data of a specimen is sharable. Therefore, it is possible to ask for observation and diagnosis on the same specimen at the same time by a plurality of specialists in pathology. Also, use of virtual slides as a teaching material for medical students can save the trouble of individually preparing specimens on slide glasses as well as assure the equal quality of teaching materials.

Further, use of a virtual slide makes it possible to illustrate the diagnostic result in front of the patient showing images of the specimen on a display unit.

Conventionally, there are some examples of a microscope used for virtual-slide creating system where the observation optical system is configured to include a dry objective of 20× and a dry objective of 40× which are exchangeable to one another, and when the priority is given to the scanning speed, the dry objective of 20× is used, while when the priority is given to the image definition, the dry objective of 40× is used. This type of microscope for virtual-slide creating system where dry objectives are exchangeable is recited in U.S. Pat. Nos. 6,101,265 and 6,272,235, for example.

Alternatively, there are some examples of a microscope used for virtual slide creating system where the observation optical system is configured to include a dry objective of 20× and a magnification varying lens of 2×, and when the priority is given to the scanning speed, only the dry objective of 20× is used, while when the definition by the image capture unit is unsatisfactory, the objective is combined with the magnification varying lens of 2×, to achieve the total magnification of 40×. This type of microscope for virtual-slide creating system where an objective combined with a magnification varying lens is disclosed in "ScanScope XT System" by Aperio (a web page found via search on Oct. 1, 2008, http://www.aperio.com/PDF_docs/quicklinks/XT%20Data.pdf).

SUMMARY OF THE INVENTION

A microscope for virtual-slide creating system according to the first aspect of the present invention is used for a virtual-slide creating system that creates a virtual slide of a specimen, and includes a stage for holding the specimen, a transmitted-light illumination optical system for illuminating the specimen with transmitted light, an objective, a tube lens, and an image capture unit. The objective is configured as a dry system of infinity-corrected type with an object-side numerical aperture NA of 0.8 or greater and a focal length for d-line rays within a range from 8 mm to 20 mm. The tube lens has a focal length for d-line rays within a range from 160 mm to 280 mm. The image capture unit has an image capture surface with a long side of 12 mm or longer and a pixel size (μm) satisfying the following condition (1)

$$a\ (\mu m) \leq (0.61 \times 0.59\ (\mu m))/NA' \quad (1)$$

where a is the pixel size, and NA' is an image-side numerical aperture.

In the microscope for virtual-slide creating system according to the first aspect of the present invention, it is preferred that the focal length for d-line rays of the tube lens is within a range from 160 mm to 220 mm.

In the microscope for virtual-slide creating system according to the first aspect of the present invention, it is much preferred that the focal length for d-line rays of the tube lens is within a range from 160 mm to 200 mm.

In the microscope for virtual-slide creating system according to the first aspect of the present invention, it is preferred that the image capture unit is a CCD camera.

Alternatively, in the microscope for virtual-slide creating system according to the first aspect of the present invention, it is preferred that the image capture unit is a TDI camera.

Alternatively, in the microscope for virtual-slide creating system according to the first aspect of the present invention, it is preferred that the image capture unit is a line sensor camera.

In the microscope for virtual-slide creating system according to the first aspect of the present invention, it is preferred that the objective is configured to have a distance from an object surface to the rearmost lens surface in a range from 55 mm to 95 mm.

A microscope for virtual-slide creating system according to the second aspect of the present invention is used for a virtual-slide creating system that creates a virtual slide of a specimen, and includes a stage for holding the specimen, a transmitted-light illumination optical system for illuminating the specimen with transmitted light, an objective, a tube lens, and an image capture unit. The objective is configured as a dry system of infinity-corrected type with an object-side numerical aperture NA of 0.8 or greater and a focal length for d-line rays within a range from 8 mm to 20 mm. The tube lens has a focal length for d-line rays within a range from 160 mm to 280 mm. The microscope further includes a magnification varying optical system to be used in combination with the tube lens. The image capture unit has an image capture surface with a long side of 12 mm or longer and a pixel size (μm) satisfying the following condition (2):

$$b\ (\mu m) \leq (0.61 \times 0.59\ (\mu m))/NA'_h \quad (2)$$

where his the pixel size and $NA'_h$ is an image-side numerical aperture at a highest-magnification position.

In the microscope for virtual-slide creating system according to the second aspect of the present invention, it is preferred that the magnification varying optical system is configured so that a magnification is changeable to a predetermined value within a range from 1.5× to 4×.

In the microscope for virtual-slide creating system according to the second aspect of the present invention, it is preferred that the image capture unit is a CCD camera.

Alternatively, in the microscope for virtual-slide creating system according to the second aspect of the present invention, it is preferred that the image capture unit is a TDI camera.

Alternatively, in the microscope for virtual-slide creating system according to the second aspect of the present invention, it is preferred that the image capture unit is a line sensor camera.

In the microscope for virtual-slide creating system according to the second aspect of the present invention, it is preferred that the objective is configured to have a distance from an object surface to the rearmost lens surface in a range from 55 mm to 95 mm.

A microscope for virtual-slide creating system according to the third aspect of the present invention is used for a virtual-slide creating system that creates a virtual slide of a specimen, and includes a stage for holding the specimen, a transmitted-light illumination optical system for illuminating the specimen with transmitted light, an image forming optical system, and an image capture unit. The image forming optical system is configured as a dry system with a total magnification within a range from 8× to 35× and an object-side numerical aperture NA of 0.8 or greater. The image capture unit has an image capture surface with a long side of 12 mm or longer and a pixel size (μm) satisfying the following condition:

$$a\ (\mu m) \leq (0.61 \times 0.59\ (\mu m))/NA' \quad (1)$$

where a is the pixel size, and NA' is an image-side numerical aperture.

In the microscope for virtual-slide creating system according to the third aspect of the present invention, it is preferred that the total magnification of the image forming optical system is within a range from 8× to 27.5×.

In the microscope for virtual-slide creating system according to the third aspect of the present invention, it is preferred that the total magnification of the image forming optical system is within a range from 8× to 25×.

In the microscope for virtual-slide creating system according to the third aspect of the present invention, it is preferred that the image capture unit is a CCD camera.

Alternatively, in the microscope for virtual-slide creating system according to the third aspect of the present invention, it is preferred that the image capture unit is a TDI camera.

Alternatively, in the microscope for virtual-slide creating system according to the third aspect of the present invention, it is preferred that the image capture unit is a line sensor camera.

A microscope for virtual-slide creating system according to the fourth aspect of the present invention is used for a virtual-slide creating system that creates a virtual slide of a specimen, and includes a stage for holding the specimen, a transmitted-light illumination optical system for illuminating the specimen with transmitted light, an image forming optical system, and an image capture unit. The image forming optical system is configured as a dry system with a total magnification within a range from Ex to 35× and an object-side numerical aperture NA of 0.8 or greater. The microscope further includes a magnification varying optical system to be used in combination with the image forming optical system. The image capture unit has an image capture surface with a long side of 12 mm or longer and a pixel size (μm) satisfying the following condition (2)

$$b\ (\mu m) \leq (0.61 \times 0.59\ (\mu m))/NA'_h \quad (2)$$

where b is the pixel size and $NA'_h$ is an image-side numerical aperture at a highest-magnification position.

In the microscope for virtual-slide creating system according to the fourth aspect of the present invention, it is preferred that the magnification varying optical system is configured so that a magnification is changeable to a predetermined value within a range from 1.5× to 4×.

In the microscope for virtual-slide creating system according to the fourth aspect of the present invention, it is preferred that the image capture unit is a COD camera.

Alternatively, in the microscope for virtual-slide creating system according to the fourth aspect of the present invention, it is preferred that the image capture unit is a TDI camera.

Alternatively, in the microscope for virtual-slide creating system according to the fourth aspect of the present invention, it is preferred that the image capture unit is a line sensor camera.

According to the present invention, it is possible to provide a microscope for virtual-slide creating system that is capable of achieving speedy image capture processing upon high-speed scanning of volumes of specimens and of acquiring images with high definition.

These and other features and advantages of the present invention will become apparent from the following detailed description of the preferred embodiments when taken in conjunction with the accompanying drawings.

BRIEF DESCRIPTION OF THE DRAWINGS

FIG. 3 is an explanatory diagram showing the schematic configuration of a microscope for virtual-slide creating system according to Embodiment 3 of the present invention.

FIG. 4 is an explanatory diagram showing the schematic configuration of a microscope for virtual-slide creating system according to Embodiment 4 of the present invention.

FIG. 12 is an explanatory diagram showing the schematic configuration of a microscope for virtual-slide creating system according to Embodiment 12 of the present invention.

FIG. 13 is an explanatory diagram showing the schematic configuration of a microscope for virtual-slide creating system according to Embodiment 13 of the present invention.

DETAILED DESCRIPTION OF THE PREFERRED EMBODIMENTS

Figure 1:
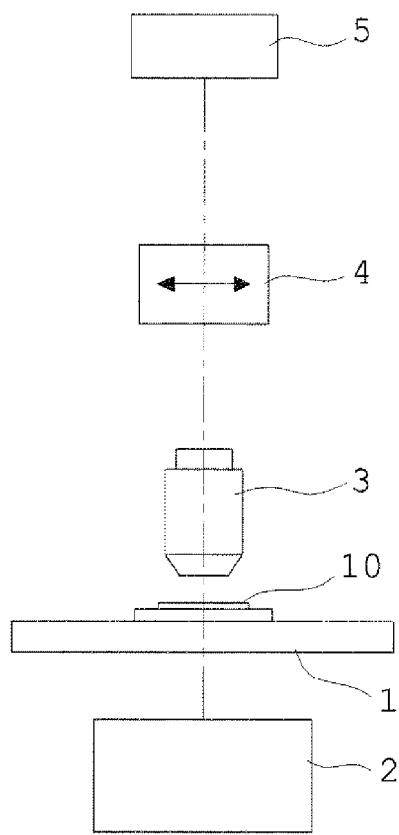
FIG. 1 is a explanatory diagram showing the schematic configuration of a microscope for virtual-slide creating system according to Embodiment 1 of the present invention.

Preceding the explanation of the preferred embodiments, the function and effect of the present invention will be explained in detail.

The microscope for virtual-slide creating system according to the first aspect of the present invention is used for a virtual-slide creating system that creates a virtual slide of a specimen, and includes a stage for holding the specimen, a transmitted-light illumination optical system for illuminating the specimen with transmitted light, an objective, a tube lens, and an image capture unit. The objective is configured as a dry system of infinity-corrected type with an object-side numerical aperture NA of 0.8 or greater and a focal length for d-line rays within a range from 8 mm to 20 mm. The tube lens has a focal length for d-line rays within a range from 160 mm to 280 mm.

This arrangement results in the total magnification of the objective and the tube lens combined together in a range from 8× to 35×, to provide a wide object-side view field. Since a wide view field can be scanned at one time, the number of times of scanning can be reduced, to increase the scanning speed.

Not like a liquid immersion system, the objective configured as a dry system simplifies the handling manner of specimens, to expedite loading of specimens on the stage.

The object-side numerical aperture NA of 0.8 or greater assures a sufficient resolution for examination of various pathological specimens for diagnosis.

In addition, since only a single objective is needed, not like the configuration where objectives different in magnification alternate, the view near the stage is not obstructed.

A light source for the transmitted-light illumination optical system is allowed to be any one of a halogen lamp, a mercury arc lamp, a metal halide arc lamp, and a LED. The illumination optical system is desirably configured using a lens, a fiber, and a diffusing plate.

In the microscope for virtual-slide creating system according to the first aspect of the present invention, it is preferred that the focal length for d-line rays of the tube lens is within a range from 160 mm to 220 mm. This arrangement results in the total magnification of the objective and the tube lens combined together to be in a range from 8× to 32×, easily securing a wide object-side view field. Further, it is much preferred that the focal length for d-line rays of the tube lens is within a range from 160 mm to 200 mm. This arrangement results in the total magnification of the objective and the tube lens combined together to be in a range from 8× to 25×, more easily securing a wide object-side view field.

Furthermore, in the microscope for virtual-slide creating system according to the first aspect of the present invention, the image capture unit has an image capture surface with a long side of 1.2 mm or longer and a pixel size a (μm) satisfying Condition (1).

Even if the magnification of the optical system is designed to be low, a CCD area camera having an image capture region that is small in area cannot capture an image of a wide range at one time, or a line sensor camera or a TDI camera having a small image capture region cannot scan a wide range.

In this regard, arranging the long side of the image capture surface to be 12 mm or longer can achieve image capture over a wide view field in combination with the configuration of the optical system described above.

For reference, here is introduced a ⅔-inch camera, which is commonly used as a camera for a microscope nowadays and has an image capture surface of 9 mm (long side)×7 mm (short side) with 11 mm diagonal. If an area camera having an image capture surface of 12.3 mm×12.3 mm with 17.4 mm diagonal and 2048×2048 pixels of 6 μm×6 μm pixel size is used instead, twice an area can be captured, to reduce the number of times of scanning.

Alternatively, if a line camera having an image capture surface of 24.6 mm length with 4096 pixels of 6 μm×6 μm pixel size is used, the scan range can be widened, to reduce the number of times of scanning.

Even if the numerical aperture NA of the objective is 0.8 or greater to assure a sufficient optical resolution, a pixel size of an image capture camera not being small enough would render the image-side airy disc to remain unresolved. That is, if the resolution of an image capture camera is not good, the good optical resolution cannot work favorably. Condition (1) specified above signifies that the image-side airy disc diameter can be resolved by at least two pixels. In general, the image-side airy disc diameter is expressed by (1.22×0.59 (μm))/(image-side numerical aperture NA', where 1.22 is a coefficient, and 0.59 μm is the wavelength of d-line rays.

In consideration of the relation between the cut-off frequency of the optical system and the Nyquist frequency of the image capture camera, a pixel size smaller than that limited by Condition (1) is desirable. However, Condition (1) specifies the practical image definition for pathological specimens.

For example, if the total magnification is 10× and the object-side numerical aperture NA is 0.80, the image-side numerical aperture NA' becomes 0.080, and thus the pixel size a is required to satisfy a≦4.5 μm.

If the total magnification is 10× and the object-side numerical aperture NA is 0.85, the image-side numerical aperture NA' becomes 0.085, and thus the pixel size a is required to satisfy a≦4.2 μm.

If the total magnification is 10× and the object-side numerical aperture NA is 0.90, the image-side numerical aperture NA' becomes 0.090, and thus the pixel size a is required to satisfy a≦4.0 μm.

If the total magnification is 10× and the object-side numerical aperture NA is 0.95, the image-side numerical aperture NA' becomes 0.095, and thus the pixel size a is required to satisfy a≦3.8 μm.

If the total magnification is 20× and the object-side numerical aperture NA is 0.80, the image-side numerical aperture NA' becomes 0.0400, and thus the pixel size a is required to satisfy a≦9.0 μm.

If the total magnification is 20× and the object-side numerical aperture NA is 0.85, the image-side numerical aperture NA' becomes 0.0425, and thus the pixel size a is required to satisfy a≦8.5 μm.

If the total magnification is 20× and the object-side numerical aperture NA is 0.90, the image-side numerical aperture NA' becomes 0.0450, and thus the pixel size a is required to satisfy a≦8.0 μm.

If the total magnification is 20× and the object-side numerical aperture NA is 0.95, the image-side numerical aperture NA' becomes 0.0475, and thus the pixel size a is required to satisfy a≦7.6 μm.

If the total magnification is 30× and the object-side numerical aperture NA is 0.80, the image-side numerical aperture NA' becomes 0.0267, and thus the pixel size a is required to satisfy a≦13.5 μm.

If the total magnification is 30× and the object-side numerical aperture NA is 0.85, the image-side numerical aperture NA' becomes 0.0283, and thus the pixel size a is required to satisfy a≦12.7 μm.

If the total magnification is 30× and the object-side numerical aperture NA is 0.90, the image-side numerical aperture NA' becomes 0.0300, and thus the pixel size a is required to satisfy a≦12.0 μm.

If the total magnification is 30× and the object-side numerical aperture NA is 0.95, the image-side numerical aperture NA' becomes 0.0317, and thus the pixel size a is required to satisfy a≦11.4 μm.

In this manner, satisfaction of Condition (1) allows an optical image of the specimen to be captured with a practical resolution.

The image capture unit used in the microscope for virtual-slide creating system according to the first aspect of the present invention is allowed to be any one of a CCD area camera, a TDI camera, and a line sensor camera.

Also, in the microscope for virtual-slide creating system according to the first aspect of the present invention, it is preferred that the objective is configured to have a distance from the object surface to the rearmost lens surface in a range from 55 mm to 95 mm. If the distance is shorter than 55 mm, vignetting of off axial rays inside the objective becomes large, to cause shortage of amount of marginal rays. If the distance is longer than 95 mm, the weight of the objective becomes great, to be unfavorable for the mechanical structure of the microscope system.

The microscope for virtual-slide creating system according to the second aspect of the present invention is used for a virtual-slide creating system that creates a virtual slide of a specimen, and includes a stage for holding the specimen, a transmitted-light illumination optical system for illuminating the specimen with transmitted light, an objective, a tube lens, and an image capture unit. The objective is configured as a dry system of infinity-corrected type with an object-side numerical aperture NA of 0.8 or greater and a focal length for d-line rays within a range from 8 mm to 20 mm. The tube lens has a focal length for d-line rays within a range from 1.60 mm to 280 mm. The microscope further includes a magnification varying lens to be used in combination with the tube lens. The image capture unit has an image capture surface with a long side of 12 mm or longer and a pixel size b (μm) satisfying Condition (2).

As discussed above, if an objective with a large object-side numerical aperture NA and an image capture unit with a good resolution are used, an outputted electronic image has a practical definition. Therefore, only images obtained from a single objective are needed to deal with every pathological specimen. When a user such as a specialist in pathology enlarges a desired site of the electronic image to a desired magnification on an image display screen for observation, a high-definition image suitable for diagnosis can be obtained.

However, since an image capture camera with high resolution is expensive, users are sometimes obliged to use image capture cameras inferior in resolution. However, such an image capture camera with inferior resolution cannot resolve the optical image, and thus the outputted electronic image cannot have practical definition. Enlarging such an electronic image on a display screen reveals that the image of the specimen does not have a practical definition. In such a case, it is preferred to decrease the image-side numerical aperture NA' by adding a magnification varying optical system in the observation optical system to raise the total magnification. If the image-side numerical aperture is decreased, Condition (2) is satisfied and the image capture camera can resolve the optical image.

Re how to incorporate the magnification varying optical system into the microscope for virtual-slide creating system of the second aspect of the present invention, the configuration can be made so that:

1) the tube lens itself is configured as a magnification varying lens;
2) a magnification varying lens is inserted in the path of an infinity-corrected beam of rays between the objective and the tube lens; or
3) a magnification varying lens is inserted in a path of an image forming beam of rays between the tube lens and the image capture camera.

Such a magnification varying lens may be configured to have a plurality of short focal length lenses (for example, 1× and 2×) exchangeable to one another or to have a zoom function (for example, magnification is continuously variable from 1× to 2×).

In addition, it is preferred that the magnification varying optical system is configured so that a magnification is changeable to a predetermined value within a range from 1.5× to 4×.

It is preferred to determine the highest magnification considering the length of the long side of the image capture surface and the pixel size of the image capture camera.

For example, consideration is made on a case where a line sensor camera having an image capture surface of 20.5 mm length with 2048 pixels of 10 µm×10 µm pixel size is used. In this case, if an objective with a magnification of 10×, an object-side numerical aperture NA of 0.9, an image-side numerical aperture of 0.09, and a field number of 22 mm is used, the right side of Condition (2) comes to 4.0 µm and thus the pixel size of 10 µm fails to satisfy Condition (2), not assuring a sufficient definition. Here, if the total magnification is changed to 30× by adding a magnification varying lens of 3×, to reduce the image-side numerical aperture NA' to 0.03, the right side of Condition (2) comes to 12.0 µm, and thus the pixel size of 10 µm now satisfies Condition (2).

In the similar manner, in a case of an objective with a magnification of 20× and an object-side numerical aperture NA of 0.9, increasing the total magnification to 30× by adding a magnification varying lens with 1.5× makes the line sensor satisfy Condition (2).

The configuration in which a magnification varying lens is combined with an objective allows the lens production cost to be lower than the configuration in which two objectives with different magnifications are exchangeably used. In the case where 30× is an optimum total magnification, as in the example above, for obtaining a view field and a definition that are optimum for the image capture camera to be used, preparing an objective of 20× magnification and a magnification varying lens of 1.5× magnification is advantageous both in production cost and production term in reference to newly producing an objective of 30×.

The two magnifications, or the lower magnification and the higher magnification, may be used by switching in accordance with a definition required for each specimen. For example, a user may desire to observe some observation site of a specimen in a wide view field at the expense of good definition. In such a case, the user can switch the magnification varying lens to the lower magnification. Whereby, even if the total magnification comes to such a value as to render the pixel size b of the image capture camera non-satisfying Condition (2), a wide view field can be secured. On the other hand, if a user desires to observe a predetermined site of a specimen at high definition, the user can switch the magnification varying lens to the higher magnification so that the pixel size b satisfies Condition (2).

The image capture unit used in the microscope for virtual-slide creating system according to the second aspect of the present invention is allowed to be any one of a CCD area camera, a TDI camera, and a line sensor camera.

Also, in the microscope for virtual-slide creating system according to the second aspect of the present invention, it is preferred that the objective is configured to have a distance from the object surface to the rearmost lens surface in a range from 55 mm to 95 mm. If the distance is shorter than 55 mm, vignetting of off-axial rays inside the objective becomes large, to cause shortage of amount of marginal rays. If the distance is longer than 95 mm, the weight of the objective becomes great, to be unfavorable for the mechanical structure of the microscope system.

The microscope for virtual-slide creating system according to the third aspect of the present invention is used for a virtual-slide creating system that creates a virtual slide of a specimen, and includes a stage for holding the specimen, a transmitted-light illumination optical system for illuminating the specimen with transmitted light, an image forming optical system, and an image capture unit. The image forming optical system is configured as a dry system with a total magnification within a range from 8× to 35× and an object-side numerical aperture NA of 0.8 or greater.

Since the total magnification of the image forming optical system is in the range from 8× to 35×, a wide object-side view field is provided. Since a wide view field can be scanned at one time, the scanning speed is increased.

Not like a liquid immersion system, the image forming optical system configured as a dry system simplifies the handling manner of specimens, to expedite loading of specimens on the stage.

The object-side numerical aperture NA of 0.8 or greater assures a sufficient resolution for examination of various pathological specimens for diagnosis.

In the microscope for virtual-slide creating system according to the third aspect of the present invention, it is preferred that the total magnification of the image forming optical system is within a range from 8× to 27.5×. This arrangement easily secures a wide view field. It is much preferred that the total magnification of the image forming optical system is within a range from 8× to 25×. This arrangement more easily secures a wide view field.

Furthermore, in the microscope for virtual-slide creating system according to the third aspect of the present invention, the image capture unit has an image capture surface with a long side of 12 mm or longer and a pixel size a (µm) satisfying Condition (1).

The image capture unit used in the microscope for virtual-slide creating system according to the third aspect of the present invention is allowed to be any one of a CCD area camera, a TOT camera, and a line sensor camera.

The effect of the third aspect of the present invention is same as that of the first aspect of the present invention described above and thus the explanation is omitted.

The microscope for virtual-slide creating system according to the fourth aspect of the present invention is used for a virtual-slide creating system that creates a virtual slide of a specimen, and includes a stage for holding the specimen, a transmitted-light illumination optical system for illuminating the specimen with transmitted light, an image forming optical system, and an image capture unit. The image forming optical system is configured as a dry system with a total magnification within a range from 8× to 35× and an object-side numerical aperture NA of 0.8 or greater. The microscope further includes a magnification varying optical system to be used in combination with the image forming optical system. The image capture unit has an image capture surface with a long side of 12 mm or longer and a pixel size b (μm) satisfying Condition (2).

The effect of the fourth aspect of the present invention is same as that of the second aspect of the present invention described above and thus the explanation is omitted.

Re how to incorporate the magnification varying optical system into the microscope for virtual-slide creating system of the fourth aspect of the present invention, it is preferred that a magnification varying lens is inserted in a path of an image forming beam of rays between the image forming optical system and the image capture camera.

The magnification varying optical system may be configured to have a plurality of short focal length lenses (for example, 1× and 2×) exchangeable to one another or to have a zoom function (for example, magnification is continuously variable from 1× to 2×). In addition, it is preferred that the magnification varying optical system is configured so that a magnification is changeable to a predetermined value within a range from 1.5× to 4×.

The image capture unit used in the microscope for virtual-slide creating system according to the second aspect of the present invention is allowed to be any one of a CCD area camera, a TDI camera, and a line sensor camera.

The preferred embodiments of the present invention will be explained in detail below in conjunction with the accompanying drawings.

Embodiment 1

FIG. 1 is a explanatory diagram showing the schematic configuration of a microscope for virtual-slide creating system according to Embodiment 1 of the present invention.

The microscope for virtual-slide creating system of Embodiment 1 has a stage 1, a bright-field transmitted-light illumination optical system 2, an objective 3, a tube lens 4, and an image capture camera 5. In FIG. 1, the reference numeral 10 denotes a specimen.

The stage 1 holds the specimen 10. The bright-field transmitted-light illumination optical system 2 illuminates the specimen 10 mounted on the stage with transmitted light.

The objective 3 is configured as a dry system of infinity-corrected type with an object-side numerical aperture NA of 0.8 or greater, and a focal length for d-line rays within a range from 8 mm to 20 mm.

The tube lens 4 has a focal length for d-line rays within a range from 160 mm to 280 mm.

The image capture camera 5 is one of a CCD camera, a TDI camera and a line sensor camera, and is configured to have an image capture surface with a long side of 12 mm or longer and a pixel size a (μm) satisfying Condition (1).

Embodiment 2

Figure 2:
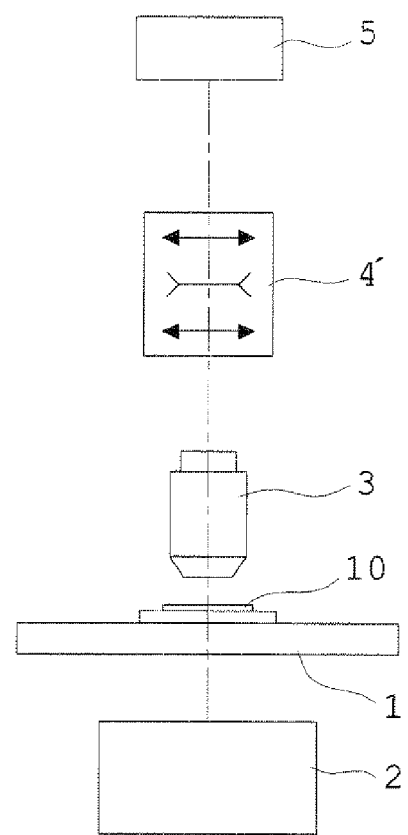
FIG. 2 is an explanatory diagram showing the schematic configuration of microscope for virtual-slide creating system according to Embodiment 2 of the present invention.

FIG. 2 is an explanatory diagram showing the schematic configuration of a microscope for virtual-slide creating system according to Embodiment 2 of the present invention.

The microscope for a virtual-slide creating system of Embodiment 2 has a stage 1, a bright-field transmitted-light illumination optical system 2, an objective 3, a tube lens 4', and an image capture camera 5. In FIG. 2, the reference numeral 10 denotes a specimen.

The tube lens 4' is configured to be capable of changing the magnification continuously. For example, it has a function of continuous change in a range from 1× to 2×, in a ranged from 1× to 3×, in a range from 1× to 4× or in another range.

The image capture camera 5 is configured to have an image capture surface with a long side of 12 mm or longer and a pixel size b (μm) satisfying Condition (2).

The remaining structure is substantially the same as the microscope for virtual-slide creating system of FIG. 1.

Embodiment 3

FIG. 3 is an explanatory diagram showing the schematic configuration of a microscope for virtual-slide creating system according to Embodiment 3 of the present invention.

The microscope for a virtual-slide creating system of Embodiment 3 has a stage 1, a bright-field transmitted-light illumination optical system 2, an objective 3, a magnification varying lens 6, a tube lens 4, and an image capture camera 5. In FIG. 3, the reference numeral 10 denotes a specimen.

The magnification varying lens 6 is removably arranged in a path of an infinity-corrected beam of rays between the objective 3 and the tube lens 4, to be capable of changing the magnification, when inserted in the path, to a predetermined value within a range from 1.5× to 4×. For example, when inserted, the magnification is changed to 2×, 3×, 4× or so in reference to the magnification of ×1 at the off-the-path position.

The image capture camera 5 is configured to have an image capture surface with a long side of 12 mm or longer and a pixel size b (μm) satisfying Condition (2).

The remaining structure is substantially the same as the microscope for virtual-slide creating system of FIG. 1.

Embodiment 4

FIG. 4 is an explanatory diagram showing the schematic configuration of a microscope for virtual-slide creating system according to Embodiment 4 of the present invention.

The microscope for a virtual-slide creating system of Embodiment 4 has a stage 1, a bright-field transmitted-light illumination optical system 2, an objective 3, a tube lens 4, a magnification varying lens 6', and an image capture camera 5. In FIG. 4, the reference numeral 10 denotes a specimen.

The magnification varying lens 6' is arranged in a path of an image forming beam of rays between the tube lens 4 and the image capture camera 5, and is configured to be capable of changing the magnification continuously. For example, it has a function of continuous change in a range from 1× to 2×, in a range from 1× to 3×, in a range from 1× to 4× or in another range.

The image capture camera 5 is configured to have an image capture surface with a long side of 12 mm or longer and a pixel size b (μm) satisfying Condition (2).

The remaining structure is substantially the same as the microscope for virtual-slide creating system of FIG. 1.

Embodiment 5

Figure 5:
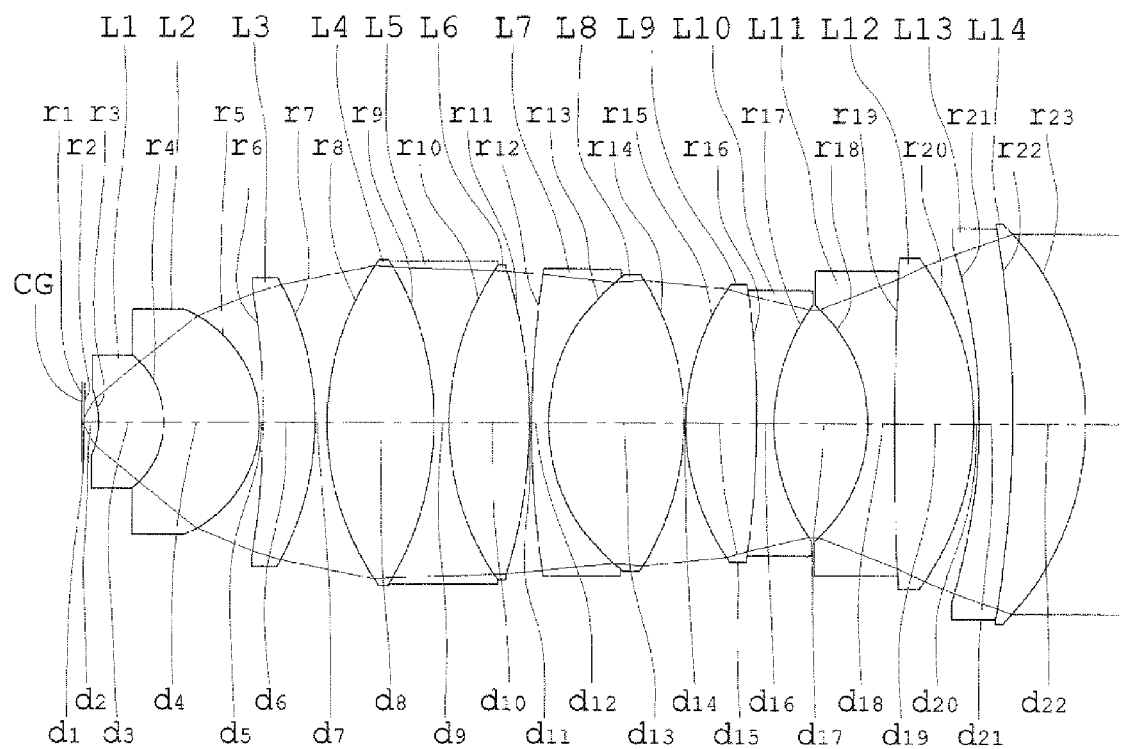
FIG. 5 is a sectional view taken along the optical axis showing the configuration of an objective used in a microscope for virtual-slide creating system, according to Embodiment 5 of the present invention.

FIG. 5 is a sectional view taken along the optical axis showing the configuration of an objective used in a microscope for virtual-slide creating system, according to Embodiment 5 of the present invention.

The objective of Embodiment 5 is one configuration example of the objective 3 in the microscope for virtual-slide creating system of one of Embodiment 1 to Embodiment 4, and includes, in order from an object side: a cemented lens composed of a first lens L1 with a positive meniscus shape directing its concave surface toward the object side and a second lens L2 with a negative meniscus shape directing its concave surface toward the object side cemented together; a third lens L3 with a positive meniscus shape directing its concave surface toward the object side; a cemented lens composed of a fourth lens L4 with a biconvex shape, a fifth lens L5 with a biconcave shape and a sixth lens L3 with a biconvex shape cemented together; a cemented lens composed of a seventh lens L7 with a negative meniscus shape directing its convex surface toward the object side and an eighth lens L8 with a biconvex shape cemented together; a cemented lens composed of a ninth lens L9 with a biconvex shape and a tenth lens L10 with a biconcave shape cemented together; a cemented lens composed of an eleventh lens L11 with a biconcave shape and a twelfth lens L12 with a biconvex shape cemented together; and a cemented lens composed of a thirteenth lens L13 with a negative meniscus shape directing its concave surface toward the object side and a fourteenth lens L14 with a positive meniscus shape directing its concave surface toward the object side cemented together. In FIG. 5, the reference symbol CG denotes a cover glass.

Numerical data of the optical members constituting the objective of Embodiment 5 are shown below. In the numerical data, S denotes surface number, r denotes radius of curvature of optical member, d denotes interval between surfaces (lens thickness or air space), nd denotes refractive index of optical member for d-line rays, vd denotes Abbe's number of optical member for d-line rays, $f_{OB}$ denotes a focal length of the objective, $f_{TL}$ denotes a focal length of the tube lens, NA denotes an entrance-side numerical aperture of the objective, and NA' denotes an exit-side numerical aperture of the combination of the objective and a tube lens. These symbols are commonly used in numerical data of the subsequent embodiments.

Numerical Data 1

Embodiment 5 focal length $f_{OB}$: 17.98 mm
object-side numerical aperture NA: 0.9
object-side view field: 2.5 mm
total length of objective
(length from object surface to rearmost lens surface): 85.06 mm
<In Combination with Tube Lens with Focal Length $f_{TL}$ of 160 mm>
total magnification: 8.9×
image-side numerical aperture NA': 0.1011
required pixel size a: a≦3.6 μm
<In Combination with Tube Lens with Focal Length $f_{TL}$ of 180 mm>
total magnification: 10×
image-side numerical aperture NA': 0.0899
required pixel size a: a≦4.0 μm
<In Combination with Tube Lens with Focal Length $f_{TL}$ of 220 mm>
total magnification: 12.2×
image-side numerical aperture NA': 0.0736
required pixel size a: a≦4.9 μm <In Combination with Tube Lens with Focal Length $f_{TL}$ of 280 mm>
total magnification: 15.6×
image-side numerical aperture NA': 0.0578
required pixel size a: a≦6.2 μm

| S | r | d | nd | vd |
|---|---|---|---|---|
| object surface | ∞ | 0.1700 | 1.52100 | 56.02 (cover glass) |
| 2 | ∞ | 1.1279 | | |
| 3 | −7.0516 | 5.7708 | 1.83481 | 42.71 |
| 4 | −6.9771 | 8.1166 | 1.67790 | 55.34 |
| 5 | −10.3743 | 0.2919 | | |
| 6 | −60.6772 | 4.4545 | 1.56907 | 71.30 |
| 7 | −24.4816 | 0.9221 | | |
| 8 | 24.4853 | 9.1035 | 1.49700 | 81.54 |
| 9 | −25.8669 | 1.1724 | 1.61340 | 44.27 |
| 10 | 24.5253 | 6.8945 | 1.43875 | 94.93 |
| 11 | −42.3002 | 0.1237 | | |
| 12 | 93.3973 | 1.5162 | 1.77250 | 49.60 |
| 13 | 16.3000 | 11.1972 | 1.43875 | 94.93 |
| 14 | −23.1580 | 0.1000 | | |
| 15 | 20.5004 | 6.0817 | 1.43875 | 94.93 |
| 16 | −75.1969 | 1.4623 | 1.61340 | 44.27 |
| 17 | 17.6631 | 8.0005 | | |
| 18 | −13.4674 | 2.2529 | 1.67790 | 55.34 |
| 19 | 269.0801 | 6.7506 | 1.43875 | 94.93 |
| 20 | −23.1951 | 0.4711 | | |
| 21 | −49.4408 | 2.8792 | 1.51633 | 64.14 |
| 22 | −89.4578 | 6.2002 | 1.67300 | 38.15 |
| 23 | −23.6639 | | | |

Embodiment 6

Figure 6:
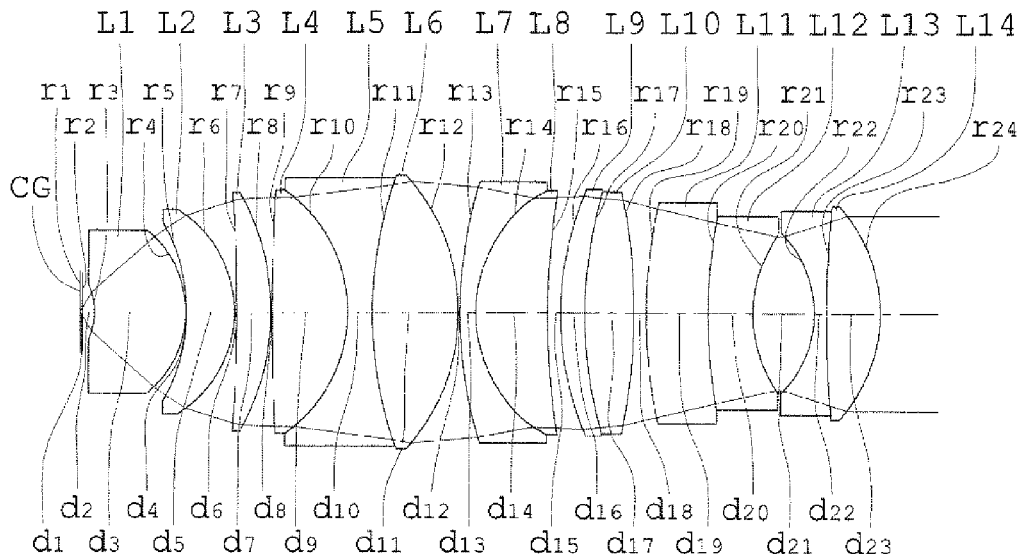
FIG. 6 is a sectional view taken along the optical axis showing the configuration of an objective used in a microscope for virtual-slide creating system, according to Embodiment 6 of the present invention.

FIG. 6 is a sectional view taken along the optical axis showing the configuration of an objective used in a microscope for virtual-slide creating system, according to Embodiment 6 of the present invention.

The objective of Embodiment 6 is another configuration example of the objective 3 in the microscope for virtual-slide creating system of one of Embodiment 1 to Embodiment 4, and includes, in order from an object side: a first lens L1 with a positive meniscus shape directing its concave surface toward the object side; a second lens L2 with a positive meniscus shape directing its concave surface toward the object side; a third lens L3 with a positive meniscus shape directing its concave surface toward the object side; a cemented lens composed of a fourth lens L4 with a biconvex shape, a fifth lens L5 with a biconcave shape and a sixth lens L6 with a biconvex shape cemented together; a cemented lens composed of a seventh lens L7 with a negative meniscus shape directing its convex surface toward the object side and an eighth lens L8 with a positive meniscus shape directing its convex surface toward the object side cemented together; a cemented lens composed of a ninth lens L9 with a positive meniscus shape directing its convex surface toward the object side and a tenth lens L10 with a biconvex shape cemented together; a cemented lens composed of an eleventh lens L11 with a positive meniscus shape directing its convex surface toward the object side and a twelfth lens L12 with a negative meniscus shape directing its convex surface toward the object side cemented together; and a cemented lens composed of a thirteenth lens L13 with a biconcave shape and a fourteenth lens L14 with a biconvex shape cemented together. In FIG. 6, the reference symbol CG denotes a cover glass.

Numerical data of the optical members constituting the objective of Embodiment 6 are shown below.

Numerical Data 2

Embodiment 6 focal length $f_{OB}$: 8.99 mm
object-side numerical aperture NA: 0.9
object-side view field: 1.5 mm
total length of objective
(length from object surface to rearmost lens surface): 65.676 mm
<In Combination with Tube Lens with Focal Length $f_{TL}$ of 160 Mm>
total magnification: 17.8×
image-side numerical aperture NA': 0.0506
required pixel size a: a<7.1 μm
<In Combination with Tube Lens with Focal Length $f_{TL}$ of 180 mm>
total magnification: 20×
image-side numerical aperture NA': 0.0450
required pixel size a: a≦8.0 μm
<In Combination with Tube Lens with Focal Length $f_{TL}$ of 220 mm>
total magnification: 24.5×
image-side numerical aperture NA': 0.0368
required pixel size a: a≦9.8 μm
<In Combination with Tube Lens with Focal Length $f_{TL}$ of 280 mm>
total magnification: 31.1×
image-side numerical aperture NA': 0.0289
required pixel size a: a≦12.5 μm

| S | r | d | nd | vd |
|---|---|---|---|---|
| object surface | ∞ | 0.1700 | 1.52100 | 56.02 (cover glass) |
| 2 | ∞ | 1.0275 | | |
| 3 | −5.4934 | 7.6651 | 1.88300 | 40.76 |
| 4 | −8.4262 | 0.0447 | | |
| 5 | −14.8500 | 4.0131 | 1.56907 | 71.30 |
| 6 | −9.7426 | 0.1000 | | |
| 7 | −133.0183 | 2.8626 | 1.56907 | 71.30 |
| 8 | −19.4119 | 0.1000 | | |
| 9 | 357.0144 | 6.1700 | 1.49700 | 81.54 |
| 10 | −12.2819 | 2.0000 | 1.63775 | 42.41 |
| 11 | 35.3625 | 7.1229 | 1.43875 | 94.93 |
| 12 | −16.7512 | 0.1000 | | |
| 13 | 38.3576 | 1.2435 | 1.63775 | 42.41 |
| 14 | 11.7900 | 5.7901 | 1.43875 | 94.93 |
| 15 | 69.0762 | 1.0000 | | |
| 16 | 26.1185 | 2.0000 | 1.63775 | 42.41 |
| 17 | 34.8260 | 4.0205 | 1.43875 | 94.93 |
| 18 | −45.9999 | 1.0000 | | |
| 19 | 43.4784 | 5.0710 | 1.43875 | 94.93 |
| 20 | 48.1030 | 3.6893 | 1.67300 | 38.15 |
| 21 | 11.8879 | 5.0000 | | |
| 22 | −9.5671 | 1.0000 | 1.61800 | 63.33 |
| 23 | 101.1055 | 4.4853 | 1.72342 | 37.95 |
| 24 | −13.0968 | | | |

Embodiment 7

Figure 7:
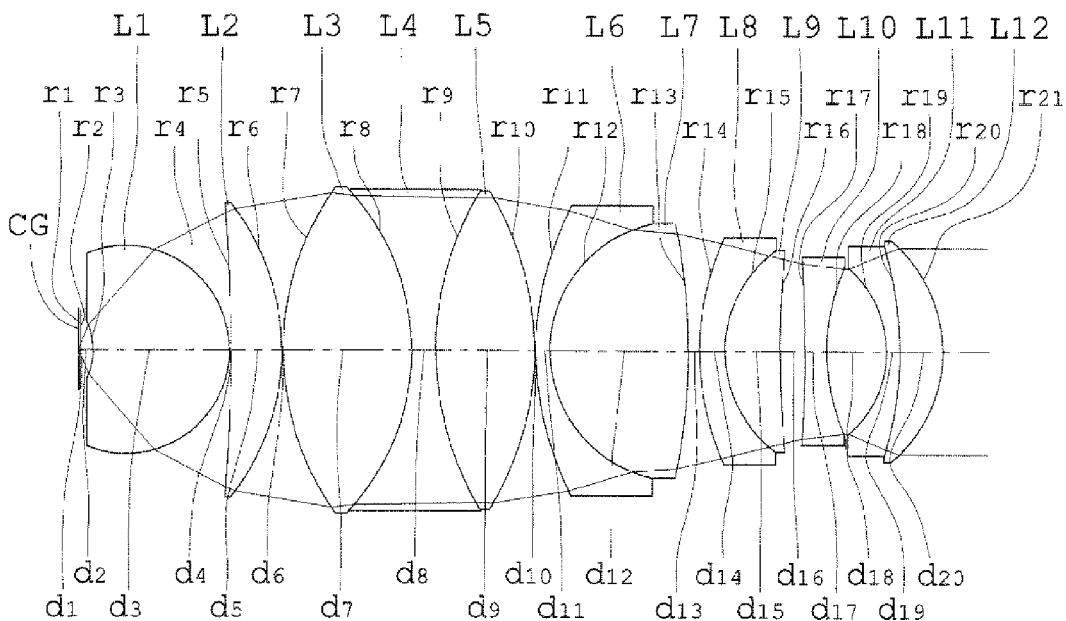
FIG. 7 is a sectional view taken along the optical axis showing the configuration of an objective used in a microscope for virtual-slide creating system, according to Embodiment 7 of the present invention.

FIG. 7 is a sectional view taken along the optical axis showing the configuration of an objective used in a microscope for virtual-slide creating system, according to Embodiment 7 of the present invention.

The objective of Embodiment 7 is still another configuration example of the objective 3 in the microscope for virtual-slide creating system of one of Embodiment 1 to Embodiment 4, and includes, in order from an object side: a first lens L1 with a positive meniscus shape directing its concave surface toward the object side; a second lens L2 with a positive meniscus shape directing its concave surface toward the object side; a cemented lens composed of a third lens L3 with a biconvex shape, a fourth lens L4 with a biconcave shape, and a fifth lens L5 with a biconvex shape cemented together; a cemented lens composed of a sixth lens L6 with a negative meniscus shape directing its convex surface toward the object side and a seventh lens L7 with a biconvex shape cemented together; a cemented lens composed of an eighth lens L8 with a negative meniscus shape directing its convex surface toward the object side and a ninth lens L9 with a positive meniscus shape directing its convex surface toward the object side cemented together; a tenth lens L10 with a biconcave shape; and a cemented lens composed of an eleventh lens with a negative meniscus shape directing its concave surface toward the object side and a twelfth lens L12 with a positive meniscus shape directing its concave surface toward the object side cemented together. In FIG. 7, the reference symbol CG denotes a cover glass.

Numerical data of the optical members constituting the objective of Embodiment 7 are shown below.

Numerical Data 3

Embodiment 7 focal length $f_{OB}$: 8.99 mm
object-side numerical aperture NA: 0.95
object-side view field: 1.25 mm
total length of objective
(length from object surface to rearmost lens surface): 70.830 mm
<In Combination with Tube Lens with Focal Length $f_{TL}$ of 160 mm>
total magnification: 17.8×
image-side numerical aperture NA': 0.0534
required pixel size a: a≦6.7 μm
<In Combination with Tube Lens with Focal Length $f_{TL}$ of 180 mm>
total magnification: 20×
image-side numerical aperture NA': 0.0474
required pixel size a: a≦7.6 μm
<In Combination with Tube Lens with Focal Length $f_{TL}$ of 220 mm>
total magnification: 24.5×
image-side numerical aperture NA': 0.0388
required pixel size a: a≦9.3 μm
<In Combination with Tube Lens with Focal Length $f_a$ of 280 mm>
total magnification: 31.1×
image-side numerical aperture NA': 0.0305
required pixel size a: a≦11.8 μm

| S | r | d | nd | vd |
|---|---|---|---|---|
| object surface | ∞ | 0.1700 | 1.52100 | 56.02 (cover glass) |
| 2 | ∞ | 1.0010 | | |
| 3 | −5.4333 | 11.3905 | 1.67790 | 55.34 |
| 4 | −8.5877 | 0.1000 | | |
| 5 | −104.8848 | 4.1424 | 1.56907 | 71.30 |
| 6 | −19.5161 | 0.1000 | | |
| 7 | 23.7560 | 10.4025 | 1.49700 | 81.54 |
| 8 | −19.6992 | 2.0000 | 1.63775 | 42.41 |
| 9 | 25.2233 | 8.2035 | 1.43875 | 94.93 |
| 10 | −24.9665 | 0.1266 | | |
| 11 | 27.7141 | 1.0715 | 1.63775 | 42.41 |
| 12 | 10.8195 | 11.2828 | 1.43875 | 94.93 |

-continued

| S | r | d | nd | vd |
|---|---|---|---|---|
| 13 | −48.7196 | 1.0000 | | |
| 14 | 24.4445 | 2.0000 | 1.63775 | 42.41 |
| 15 | 10.5534 | 4.5611 | 1.43875 | 94.93 |
| 16 | 121.7083 | 2.0000 | | |
| 17 | −72.4490 | 1.6702 | 1.51633 | 64.14 |
| 18 | 17.2984 | 5.0000 | | |
| 19 | −9.0745 | 1.0053 | 1.61800 | 63.33 |
| 20 | −30.8886 | 3.6028 | 1.73800 | 32.26 |
| 21 | −11.7872 | | | |

Each objective of Embodiment 5 to Embodiment 7 is an infinity-corrected type objective. Therefore, the objective does not form an image by itself. For example, in a case where one of the objectives of Embodiment 5 to Embodiment 7 is used as the objective 3 in the virtual-slide creating system of Embodiment 1, 3 or 4, it is preferred to use one of the tube lenses of Embodiment 8 to Embodiment 11 described later. The tube lenses of Embodiment 8 to embodiment 11 are tube lenses with focal lengths for d-line rays of 160 mm, 180 mm, 220 mm, and 280 mm, respectively. In this case, it is desirable to set a distance between the objective and the tube lens within a range from 0 mm to 150 mm.

Embodiment 8

Figure 8:
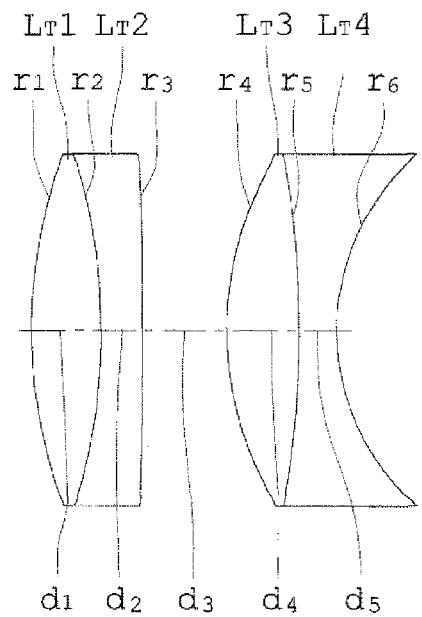
FIG. 8 is a sectional view taken along the optical axis showing the configuration of a tube lens used in a microscope for virtual-slide creating system, according to Embodiment 8 of the present invention.

FIG. 8 is a sectional view taken along the optical axis showing the configuration of a tube lens used in a microscope for virtual-slide creating system, according to Embodiment 8 of the present invention.

The tube lens of Embodiment 8 is one configuration example of the tube lens 4 in the microscope for virtual-slide creating system of Embodiment 1, 3 or 4, and includes, in order from the object side: a cemented lens composed of a first lens $L_t1$ with a biconvex shape and a second lens $L_t2$ with a negative meniscus shape directing its concave surface toward the object side cemented together; and a cemented lens composed of a third lens $L_t3$ with a biconvex shape and a fourth lens $L_T4$ with a biconcave shape cemented together.

Numerical data of the optical members constituting the tube lens of Embodiment 8 are shown below.

Numerical Data 4

Embodiment 8

| focal length $f_{TL}$: 160 mm | | | | |
|---|---|---|---|---|
| S | r | d | nd | vd |
| 1 | 53.7206 | 7.5800 | 1.49700 | 81.54 |
| 2 | −59.7624 | 4.3700 | 1.72047 | 34.71 |
| 3 | −569.3114 | 9.1600 | | |
| 4 | 39.1632 | 7.5600 | 1.72342 | 37.95 |
| 5 | −101.2322 | 3.9000 | 1.61340 | 44.27 |
| 6 | 24.9218 | 114.6977 | | |
| image surface | ∞ | | | |

Embodiment 9

Figure 9:
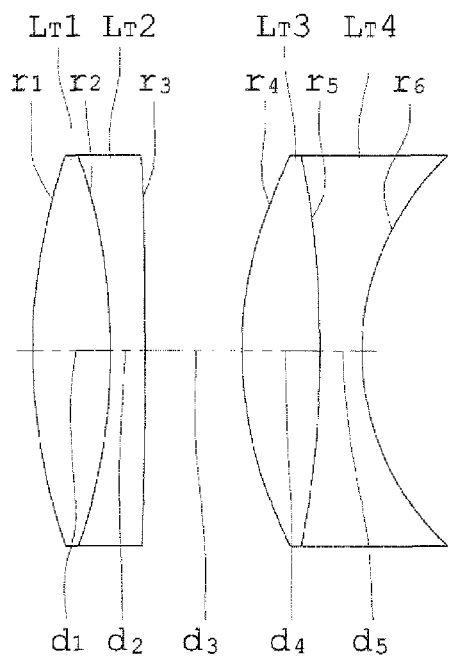
FIG. 9 is a sectional view taken along the optical axis showing the configuration of a tube lens used in a microscope for virtual-slide creating system, according to Embodiment 9 of the present invention.

FIG. 9 is a sectional view taken along the optical axis showing the configuration of a tube lens used in a microscope for virtual-slide creating system, according to Embodiment 9 of the present invention.

The tube lens of Embodiment 9 is another configuration example of the tube lens 4 in the microscope for virtual-slide creating system of Embodiment 1, 3 or 4, and includes, in order from the object side: a cemented lens composed of a first lens $L_t1$ with a biconvex shape and a second lens $L_t2$ with a negative meniscus shape directing its concave surface toward the object side cemented together; and a cemented lens composed of a third lens $L_t3$ with a biconvex shape and a fourth lens $L_T4$ with a biconcave shape cemented together.

Numerical data of the optical members constituting the tube lens of Embodiment 9 are shown below.

Numerical Data 5

Embodiment 9

| focal length $f_{TL}$: 180 mm | | | | |
|---|---|---|---|---|
| S | r | d | nd | vd |
| 1 | 60.4357 | 8.5000 | 1.49700 | 81.54 |
| 2 | −67.2328 | 3.8000 | 1.72047 | 34.71 |
| 3 | −640.4760 | 10.2859 | | |
| 4 | 44.0586 | 8.5000 | 1.72342 | 37.95 |
| 5 | −113.8863 | 4.4000 | 1.61340 | 44.27 |
| 6 | 28.0371 | 129.5618 | | |
| image surface | ∞ | | | |

Embodiment 10

Figure 10:
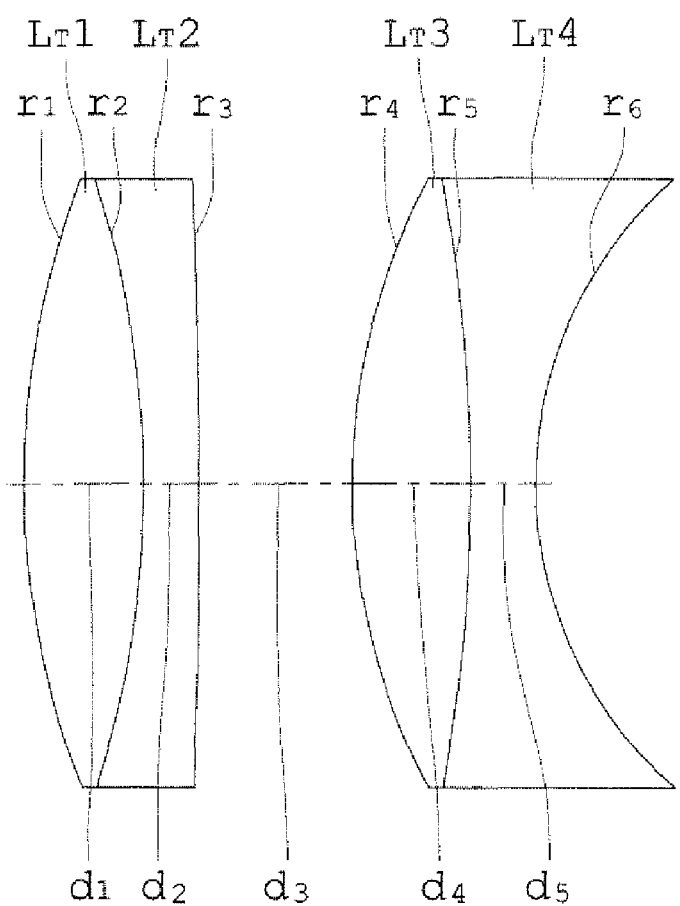
FIG. 10 is a sectional view taken along the optical axis showing the configuration of a tube lens used in a microscope for virtual-slide creating system, according to Embodiment 10 of the present invention.

FIG. 10 is a sectional view taken along the optical axis showing the configuration of a tube lens used in a microscope for virtual-slide creating system, according to Embodiment 10 of the present invention.

The tube lens of Embodiment 10 is still another configuration example of the tube lens 4 in the microscope for virtual-slide creating system of Embodiment 1, 3 or 4, and includes, in order from the object side: a cemented lens composed of a first lens $L_t1$ with a biconvex shape and a second lens $L_t2$ with a negative meniscus shape directing its concave surface toward the object side cemented together; and a cemented lens composed of a third lens $L_t3$ with a biconvex shape and a fourth lens $L_T4$ with a biconcave shape cemented together.

Numerical data of the optical members constituting the tube lens of Embodiment 10 are shown below.

Numerical Data 6

Embodiment 10

| focal length $f_{TL}$: 220 mm | | | | |
|---|---|---|---|---|
| S | r | d | nd | vd |
| 1 | 73.8658 | 10.3000 | 1.49700 | 81.54 |
| 2 | −82.1734 | 4.5000 | 1.72047 | 34.71 |
| 3 | −782.8039 | 12.7000 | | |
| 4 | 53.8494 | 10.3900 | 1.72342 | 37.95 |
| 5 | −139.1943 | 5.3800 | 1.61340 | 44.27 |
| 6 | 34.2676 | 158.3683 | | |
| image surface | ∞ | | | |

Embodiment 11

Figure 11:
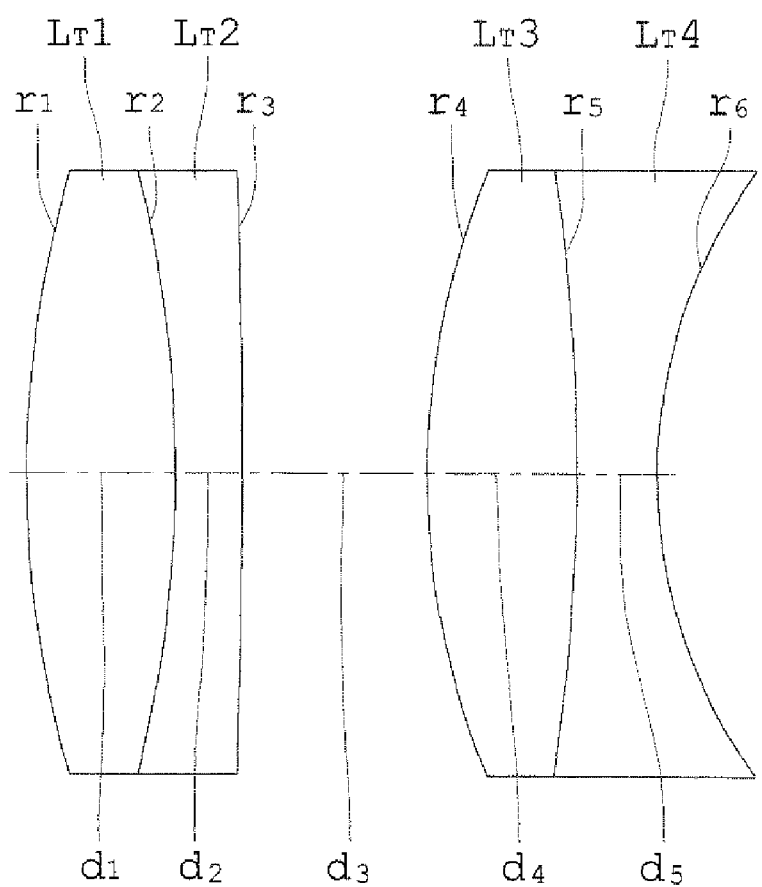
FIG. 11 is a sectional view taken along the optical axis showing the configuration of a tube lens used in a microscope for virtual-slide creating system, according to Embodiment 11 of the present invention.

FIG. 11 is a sectional view taken along the optical axis showing the configuration of a tube lens used in a microscope for virtual-slide creating system, according to Embodiment 11 of the present invention.

The tube lens of Embodiment 11 is still another configuration example of the tube lens 4 in the microscope for virtual slide creating system of Embodiment 1, 3 or 4, and includes, in order from the object side: a cemented lens composed of a first lens $L_T1$ with a biconvex shape and a second lens $L_T2$ with a negative meniscus shape directing its concave surface toward the object side cemented together; and a cemented lens composed of a third lens $L_T3$ with a biconvex shape and a fourth lens $L_T4$ with a biconcave shape cemented together.

Numerical data of the optical members constituting the tube lens of Embodiment 11 are shown below.

Numerical Data 7

Embodiment 11

| | focal length $f_{TL}$: 280 mm | | | |
|---|---|---|---|---|
| S | r | d | nd | vd |
| 1 | 94.0111 | 13.3000 | 1.49700 | 81.54 |
| 2 | −104.5844 | 5.9000 | 1.72047 | 34.71 |
| 3 | −996.2960 | 16.0000 | | |
| 4 | 68.5356 | 13.2200 | 1.72342 | 37.95 |
| 5 | −177.1565 | 6.8400 | 1.61340 | 44.27 |
| 6 | 43.6133 | 201.4905 | | |
| image surface | ∞ | | | |

Embodiment 12

FIG. 12 is an explanatory diagram showing the schematic configuration of a microscope for virtual-slide creating system according to Embodiment 12 of the present invention.

The microscope for virtual-slide creating system of Embodiment 12 has a stage 1, a bright-field transmitted-light illumination optical system 2, an image forming optical system 7, and an image capture camera 5. In FIG. 12, the reference numeral 10 denotes a specimen.

The stage 1 holds the specimen 10. The bright-field transmitted-light illumination optical system 2 illuminates the specimen 10 mounted on the stage with transmitted light.

The image forming optical system 7 is configured as a dry system with a total magnification within a range from 8× to 35× and an object-side numerical aperture NA of 0.8 or greater.

The image capture camera 5 is one of a CCD camera, a TDI camera and a line sensor camera, and is configured to have an image capture surface with a long side of 12 mm or longer and a pixel size a (μm) satisfying Condition (1).

Embodiment 13

FIG. 13 is an explanatory diagram showing the schematic configuration of a microscope for virtual-slide creating system according to Embodiment 13 of the present invention.

The microscope for a virtual-slide creating system of Embodiment 13 has a stage 1, a bright-field transmitted-light illumination optical system 2, an image forming optical system 7, a magnification varying lens 6, and an image capture camera 5. In FIG. 13, the reference numeral 10 denotes a specimen.

The magnification varying lens 6 is arranged in a path of an image forming beam of rays between the image forming optical system 7 and the image capture camera 5, and is configured to be capable of changing the magnification continuously. For example, it has a function of continuous change in a range from 1× to 2×, in a range from 1× to 3×, in a range from 1× to 4× or in another range.

The image capture camera 5 is configured to have an image capture surface with a long side of 12 mm or longer and a pixel size b (μm) satisfying Condition (2).

The remaining structure is substantially the same as the microscope for virtual-slide creating system of FIG. 12.

Embodiment 14

Figure 14:
FIG. 14 is a sectional view taken along the optical axis showing the configuration of an image forming optical system used in a microscope for virtual-slide creating system, according to Embodiment 14 of the present invention.

FIG. 14 is a sectional view taken along the optical axis showing the configuration of an image forming optical system used in a microscope for virtual-slide creating system, according to Embodiment 14 of the present invention.

The image forming optical system of Embodiment 14 is one configuration example of the image forming optical system 7 in the microscope for virtual-slide creating system of Embodiment 12 or Embodiment 13, and is configured of a combination of the optical configuration of the objective of Embodiment 5 shown in FIG. 5 and the optical configuration of the tube lens of Embodiment 9 shown in FIG. 9.

Numerical data of the optical members constituting the image forming optical system of Embodiment 14 are shown below. In the numerical data, $f_{IM}$ denotes a focal length of the entire system of the image forming optical system. Regarding numerical data of individual optical elements, they are equivalent to the numerical data 1 for Embodiment 5 plus the numerical data 5 for Embodiment 9 with an air space of 2 mm between and thus are omitted.

Numerical Data 8

Embodiment 14 focal length $f_{IM}$: 19.49 mm
magnification: 10×
object-side numerical aperture NA: 0.9
object-side view field: 2.5 mm
total length of image forming optical system
(length from object surface to image surface): 252.11 mm

Embodiment 15

Figure 15:
FIG. 15 is a sectional view taken along the optical axis showing the configuration of an image forming optical system used in a microscope for virtual-slide creating system, according to Embodiment 15 of the present invention.

FIG. 15 is a sectional view taken along the optical axis showing the configuration of an image forming optical system used in a microscope for virtual-slide creating system, according to Embodiment 15 of the present invention.

The image forming optical system of Embodiment 15 is another configuration example of the image forming optical system 7 in the microscope for virtual-slide creating system of Embodiment 12 or Embodiment 13, and is configured of a combination of the optical configuration of the objective of Embodiment 6 shown in FIG. 6 and the optical configuration of the tube lens of Embodiment 10 shown in FIG. 10.

Numerical data of the optical members constituting the image forming optical system of Embodiment 15 are shown below. In the numerical data, $f_{IM}$ denotes a focal length of the entire system of the image forming optical system. Regarding numerical data of individual optical elements, they are equivalent to the numerical data 2 for Embodiment 6 plus the numerical data 6 for Embodiment 10 with an air space of 2 mm between and thus are omitted.

Numerical Data 9

Embodiment 15 focal length $f_{IM}$: 8.15 mm
magnification: 24.5×
object-side numerical aperture NA: 0.9
object-side view field: 1.5 mm
total length of image forming optical system
(length from object surface to image surface): 269.31 mm Embodiment 16

Figure 16:
FIG. 16 is a sectional view taken along the optical axis showing the configuration of an image forming optical system used in a microscope for virtual-slide creating system, according to Embodiment 16 of the present invention.

FIG. 16 is a sectional view taken along the optical axis showing the configuration of an image forming optical system used in a microscope for virtual-slide creating system, according to Embodiment 16 of the present invention.

The image forming optical system of Embodiment 16 is still another configuration example of the image forming optical system 7 in the microscope for virtual-slide creating system of Embodiment 12 or Embodiment 13, and is configured of a combination of the optical configuration of the objective of Embodiment 7 shown in FIG. 7 and the optical configuration of the tube lens of Embodiment 11 shown in FIG. 11.

Numerical data of the optical members constituting the image forming optical system of Embodiment 16 are shown below. In the numerical data, $f_{IM}$ denotes a focal length of the entire system of the image forming optical system. Regarding numerical data of individual optical elements, they are equivalent to the numerical data 3 for Embodiment 7 plus the numerical data 7 for Embodiment 11 with an air space of 2 mm between and thus are omitted.

Numerical Data 10

Embodiment 16 focal length $f_{IM}$: 8.05 mm
magnification: 31.1×
object-side numerical aperture NA: 0.95
object-side view field: 1.25 mm
total length of image forming optical system
(length from object surface to image surface): 329.58 mm Table 1 shown below lists configuration examples of the microscope for virtual-slide creating system of Embodiment 1, in each of which the objective of one of Embodiments 5-7 and the tube lens of one of Embodiments 8-11 are combined together.

TABLE 1

| configuration example | objective | | | tube lens | | total magnification |
|---|---|---|---|---|---|---|
| | focal length $f_{OB}$ (mm) | object-side numerical aperture NA | embodiment | focal length $f_{TL}$ (mm) | embodiment | |
| 1 | 17.98 | 0.9 | 5 | 160 | 8 | 8.9 |
| 2 | 17.98 | 0.9 | 5 | 180 | 9 | 10.0 |
| 3 | 17.98 | 0.9 | 5 | 220 | 10 | 12.2 |
| 4 | 17.98 | 0.9 | 5 | 280 | 11 | 15.6 |
| 5 | 8.99 | 0.9 | 6 | 160 | 8 | 17.8 |
| 6 | 8.99 | 0.9 | 6 | 180 | 9 | 20.0 |
| 7 | 8.99 | 0.9 | 6 | 220 | 10 | 24.5 |
| 8 | 8.99 | 0.9 | 6 | 280 | 11 | 31.1 |
| 9 | 8.99 | 0.95 | 7 | 160 | 8 | 17.8 |
| 10 | 8.99 | 0.95 | 7 | 180 | 9 | 20.0 |
| 11 | 8.99 | 0.95 | 7 | 220 | 10 | 24.5 |
| 12 | 8.99 | 0.95 | 7 | 280 | 11 | 31.1 |

| configuration example | image-side numerical aperture NA' | image sensor | | | pixel size upper limit $a \leq (0.61 \times 0.59)/$ NA' (µm) |
|---|---|---|---|---|---|
| | | pixel size (µm) | number of pixels in use | length of long side (mm) | |
| 1 | 0.1011 | 3.5 × 3.5 | line 4096 | line 14.3 | 3.6 |
| 2 | 0.0899 | 3.5 × 3.5 | line 4096 | line 14.3 | 4.0 |
| 3 | 0.0736 | 3.5 × 3.5 | line 4096 | line 14.3 | 4.9 |
| 4 | 0.0578 | 3.5 × 3.5 | line 4096 | line 14.3 | 6.2 |
| 5 | 0.0506 | 6 × 6 | line 3096 | line 24.6 | 7.1 |
| 6 | 0.0450 | 6 × 6 | line-1096 | line 24.6 | 8.0 |
| 7 | 0.0368 | 6 × 6 | line 4096 | line 24.6 | 9.8 |
| 8 | 0.0289 | 6 × 6 | line 4096 | line 24.6 | 12.5 |
| 9 | 0.0534 | 6 × 6 | area 2048 × 2048 | area 12.3 × 12.3 | 6.7 |
| 10 | 0.0474 | 6 × 6 | area 2048 × 2048 | area 12.3 × 12.3 | 7.6 |
| 11 | 0.0388 | 6 × 6 | area 2048 × 2048 | area 12.3 × 12.3 | 9.3 |
| 12 | 0.0305 | 6 × 6 | area 2048 × 2048 | area 12.3 × 12.3 | 11.8 |

The microscope for virtual-slide creating system of each of Embodiments 2-4 also can be configured with the same optical parameters as shown in Table 1 above. However, each microscope of Embodiment 2-4 is provided with a magnification varying optical system, which is configured to vary the magnification to a predetermined value in a range from 1.5× to 4× and thus the pixel size of the image sensor is designed to satisfy Condition (2), which limits the pixel size b (μm) for the highest-magnification position. Therefore, in these embodiments, the pixel size is allowed to be larger than those shown in Table 1.

Table 2 shown below lists configuration examples of the microscope for virtual-slide creating system of Embodiment 12, in each of which the image forming optical system of one of Embodiments 14-16 is used.

TABLE 2

| | image forming optical system | | | | image sensor | | | | pixel size |
|---|---|---|---|---|---|---|---|---|---|
| configuration example | focal length $f_{IM}$(mm) | object-side numerical aperture NA | embodiment | magnification | image-side numerical aperture NA' | pixel size (μm) | number of pixels in use | length of long side (mm) | upper limit $a \leq (0.61 \times 0.59)/NA'$ (μm) |
| 1 | 19.49 | 0.9 | 14 | 10 | 0.0899 | 3.5 × 3.5 | line 4096 | line 14.3 | 4.0 |
| 2 | 8.15 | 0.9 | 15 | 24.5 | 0.0368 | 6 × 6 | line 4096 | line 24.6 | 9.8 |
| 3 | 8.05 | 0.95 | 16 | 31.1 | 0.0305 | 6 × 6 | area 2048 × 2048 | area 12.3 × 12.3 | 11.8 |

The microscope for virtual-slide creating system of Embodiment 13 also can be configured with the same optical parameters as shown in Table 2 above. However, the microscope of Embodiment 13 is provided with a magnification varying optical system, which is configured to vary the magnification to a predetermined value in a range from 1.5× to 4× and thus the pixel size of the image sensor is designed to satisfy Condition (2), which limits the pixel size b (μm) for the highest-magnification position. Therefore, in this embodiment, the pixel size is allowed to be larger than those shown in Table 2.

While the embodiments of the microscope for virtual-slide creating system of the present invention are explained above, the microscope for virtual-slide creating system of the present invention is not limited to the configurations of these embodiments, and may be configured more freely as long as the configuration requirements of the present invention are satisfied.

As is apparent from the explanation above, the microscope for virtual-slide creating system according to the present invention is useful in clinical and medical fields where pathological diagnosis is made using a virtual slide.

What is claimed is:

1. A microscope for virtual-slide creating system, which creates a virtual slide of a system, comprising:
a stage for holding the specimen;
a transmitted-light illumination optical system for illuminating the specimen with transmitted light;
an objective;
a tube lens;
a magnification Varying optical system used in combination with the tube lens;
and an image capture unit, wherein the objective is configured as a dry system of infinity-corrected type with an object-side numerical aperture NA of 0.8 or greater and a focal length for d-line rays within a range from 8 mm to 20 mm, wherein the tube lens has a focal length for d-line rays within a range from 160 mm to 280 mm, and wherein an image capture surface of the image capture unit has a long side of 12 mm or longer and a pixel size (μm) satisfying the following condition:

$$b\ (\mu m) \leq (0.61 \times 0.59\ (\mu m))/NA'_h$$

where b is the pixel size, and $NA'_h$ is an image-side numerical aperture at a highest-magnification position.

2. A microscope for virtual-slide creating system according to claim 1, wherein the magnification varying optical system is configured so that a magnification is changeable to a predetermined value within a range from 1.5× to 4×.

3. A microscope for virtual-slide creating system according to claim 1, wherein the image capture unit is a CCD camera.

4. A microscope for virtual-slide creating system according to claim 1, wherein the image capture unit is a TDI camera.

5. A microscope for virtual-slide creating system according to claim 1, wherein the image capture unit is a line sensor camera.

6. A microscope for virtual-slide creating system, which is used for a virtual-slide creating system that creates a virtual slide of a specimen, comprising:
a stage for holding the specimen;
a transmitted-light illumination optical system for illuminating the specimen with transmitted light;
an image forming optical system;
a magnification varying optical system used in combination with the image forming optical system; and
an image capture unit, wherein the image forming optical system is configured as a dry system with a total magnification within a range from 8× to 35× and an object-side numerical aperture NA of 0.8 or greater, and wherein the image capture unit has an image capture surface with a long side of 12 mm or longer and a pixel size (μm) satisfying the following condition:

$$b\ (\mu m) \leq (0.61 \times 0.59\ (\mu m))/NA'_h$$

where b is the pixel size, and $NA'_h$ is an image-side numerical aperture at a highest-magnification position.

7. A microscope for virtual-slide creating system according to claim 6, wherein the magnification varying optical system is configured so that a magnification is changeable to a predetermined value within a range from 1.5× to 4×.

8. A microscope for virtual-slide creating system according to claim 6, wherein the image capture unit is a CCD camera.

9. A microscope for virtual-slide creating system according to claim 6, wherein the image capture unit is a TDI camera.

10. A microscope for virtual-slide, system according to claim 6, wherein the image capture unit is a line sensor camera.

11. A microscope for virtual-slide creating system, which is used for a virtual-slide creating system that creates a virtual slide of a specimen, comprising;

a stage for holding the specimen;
a transmitted-light illumination optical system for illuminating the specimen with transmitted light;
an objective;
a tube lens;
a magnification varying optical system used in combination with the tube lens; and
an image capture unit, wherein the objective is configured as a dry system of infinity-corrected type with an object-side numerical aperture NA of 0.8 or greater, a focal length for d-line rays within a range from 8 mm to 20 mm, and a distance from an object surface to a rearmost lens surface in a range from 55 mm to 95 mm, wherein the tube lens has a focal length for d-line rays within a range from 160 mm to 280 mm, wherein the magnification varying optical system is configured so that a magnification is changeable to a predetermined value in a range from 1.5× to 4×, and wherein the image capture unit has an image capture surface with a long side of 12 mm or longer and a pixel size (μm) satisfying the following condition:

$$b\ (\mu m) \leq (0.61 \times 0.59\ (\mu m))/NA'_h$$

where b is the pixel size, and $NA'_h$ is an image-side numerical aperture at a highest-magnification position.

* * * * *